No. 889,947. PATENTED JUNE 9, 1908.
H. H. MILLER.
SEED PLANTING MACHINE.
APPLICATION FILED AUG. 30, 1907.

3 SHEETS—SHEET 1.

Witnesses:
R. M. Mowry
G. R. Driscoll

Inventor,
Horace H. Miller
by
Attorney.

No. 889,947. PATENTED JUNE 9, 1908.
H. H. MILLER.
SEED PLANTING MACHINE.
APPLICATION FILED AUG. 30, 1907.
3 SHEETS—SHEET 2.
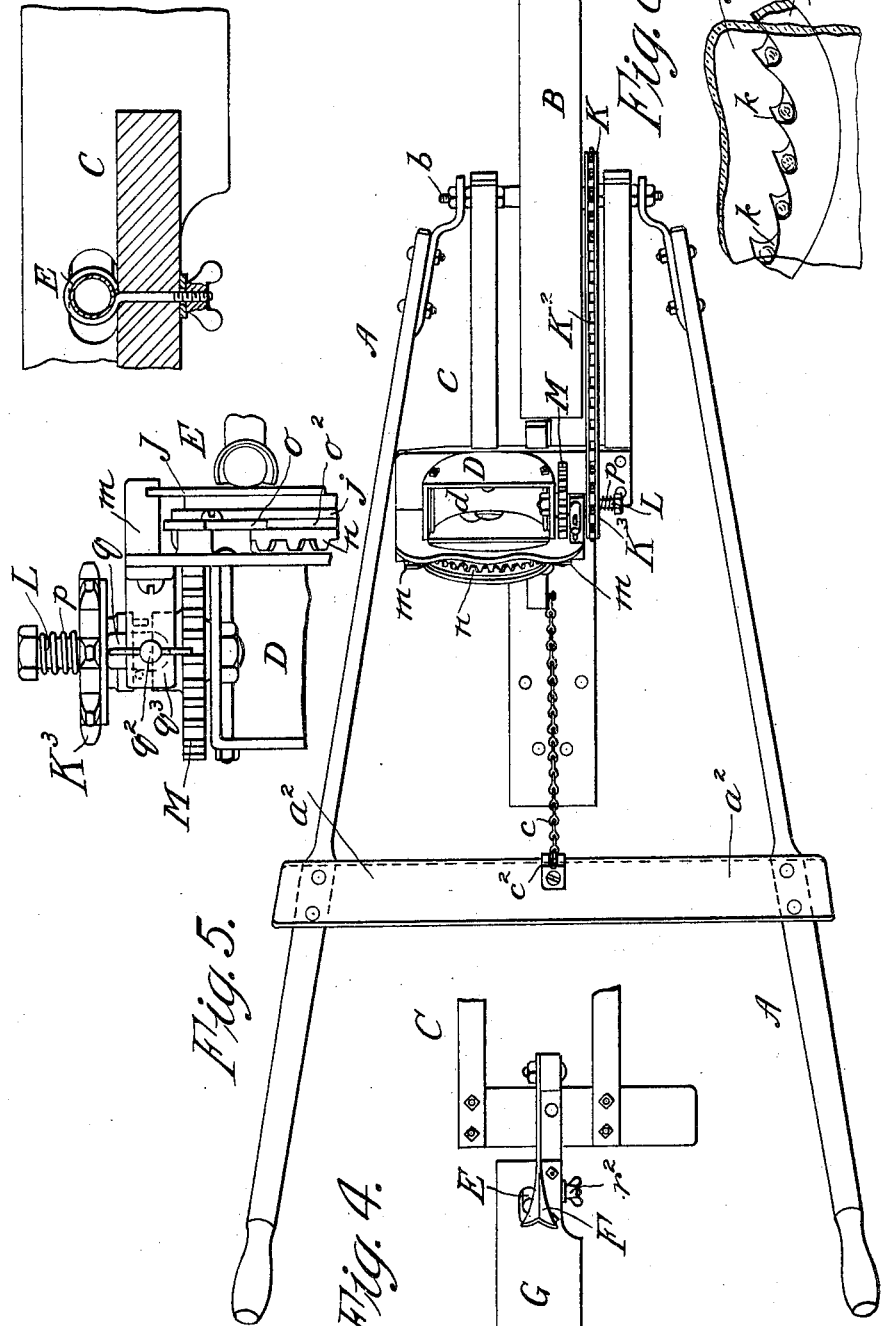
Witnesses:
R. M. Mowry
G. R. Driscoll
Inventor,
Horace H. Miller
by ℣℣. ℣. Bellows
Attorney.

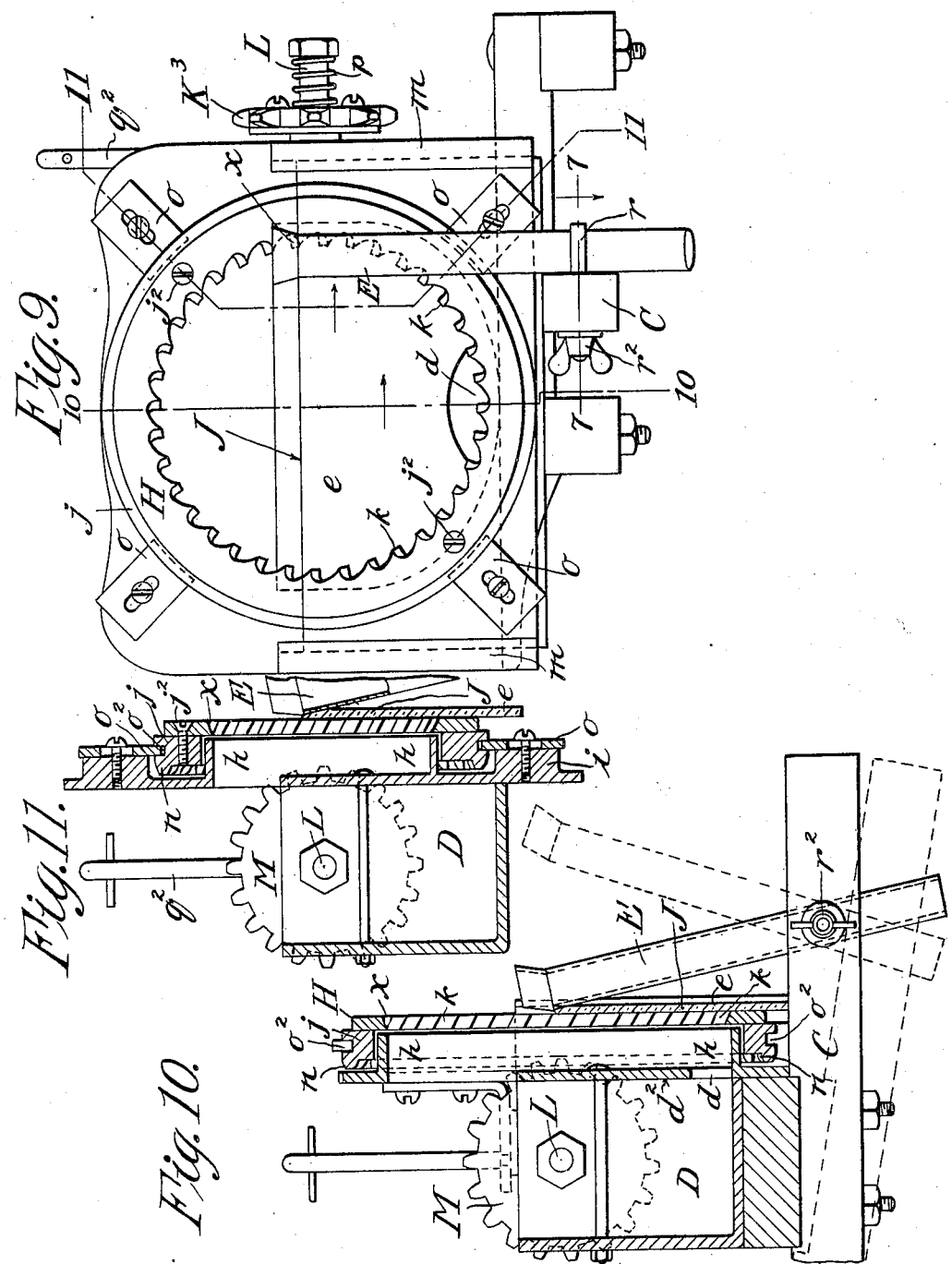

UNITED STATES PATENT OFFICE.

HORACE H. MILLER, OF LYNDON, VERMONT.

SEED-PLANTING MACHINE.

No. 889,947.      Specification of Letters Patent.      Patented June 9, 1908.

Application filed August 30, 1907. Serial No. 390,841.

To all whom it may concern:

Be it known that I, HORACE H. MILLER, a citizen of the United States of America, and resident of Lyndon, in the county of Caledonia and State of Vermont, have invented certain new and useful Improvements in Seed-Planting Machines, of which the following is a full, clear, and exact description.

The present seed planting machine comprises improved mechanism and devices mounted on a wheeled frame, operative, as the machine is trundled and advanced to form 'a furrow to receive the seeds, to deliver the seeds, one at a time, at regular distances apart, and to cover the seeds deposited in the furrow with the dirt just previously thrown up from the furrow.

Another object of my invention resides in the provision of a removable, annular, gear-carrying member, a removable, annular, seed feeding ring, and a removable, glass plate, and in the furnishing of novel means permitting such removability of these parts. The advantage in having these parts removable is that, when a part becomes worn, or broken, it may be easily replaced by another new part.

Other objects incidental to the operation of a highly practical and efficient seed planting machine are attained in and by the arrangements of the devices and the constructions thereof.

The invention consists in the combinations, arrangements and constructions of parts substantially as hereinafter fully described and set forth in the claims.

Figure 2:
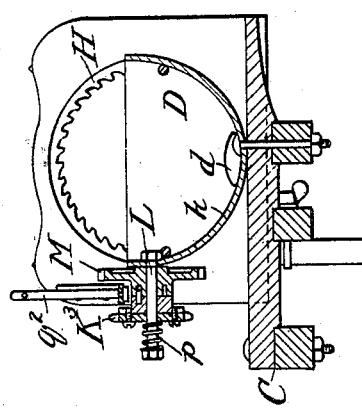
Figure 3:
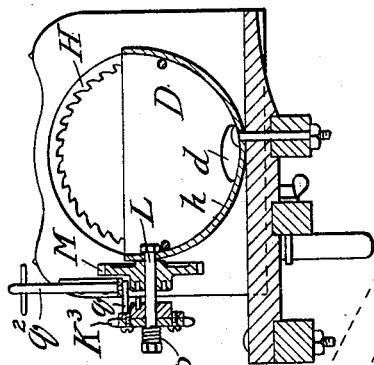
Figure 1:
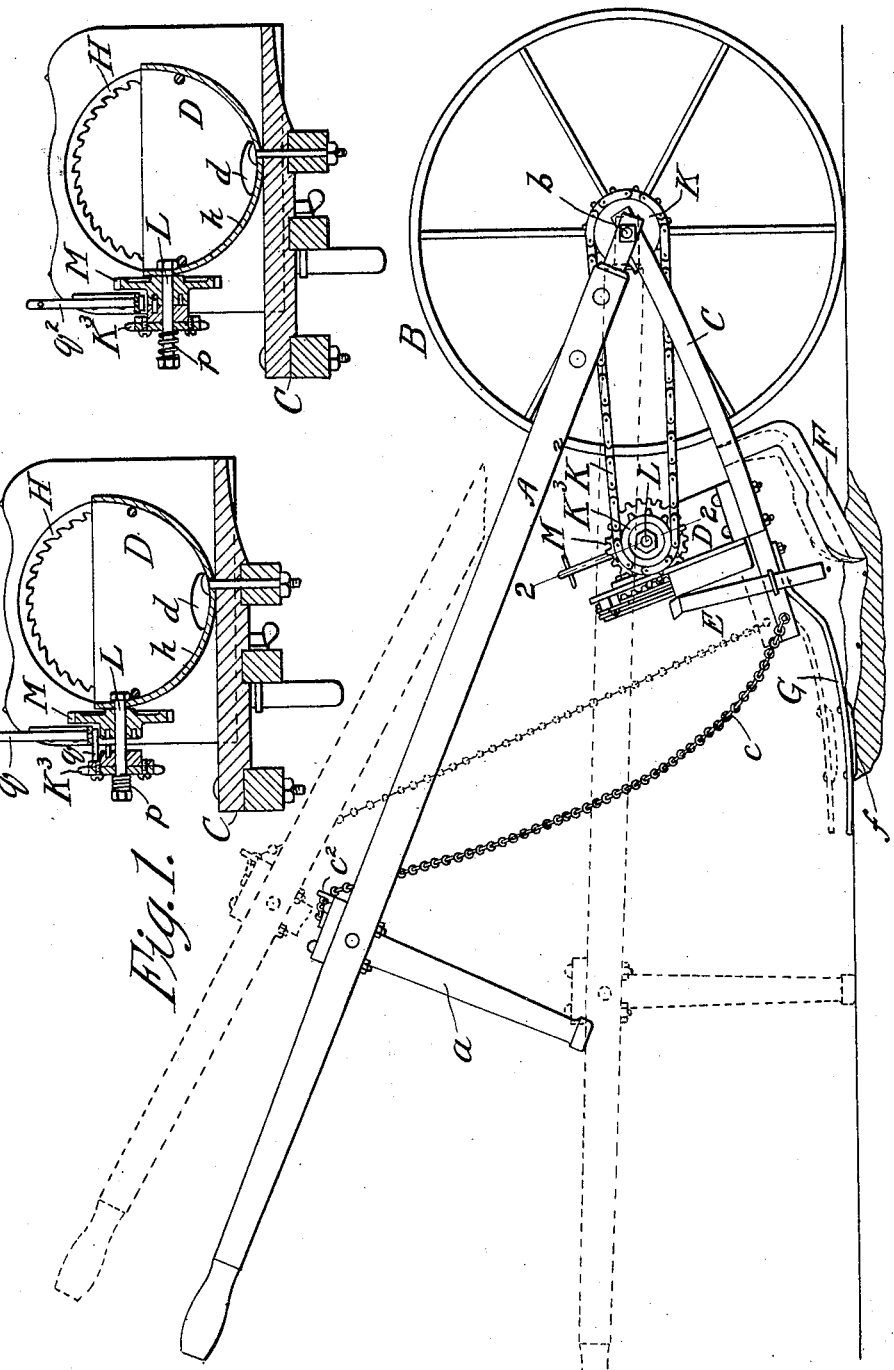

In the drawings,—Figure 1 is a side elevation of the seed planting machine; Fig. 2 is a cross sectional view of a portion of the machine as shown on the line 2—2, Fig. 1, particularly representing the clutch included in the mechanism for driving the seed feeding wheel, the driving connections being shown "in clutch"; Fig. 3 is a view similar to Fig. 2, but showing the clutch members as thrown "out of clutch". Fig. 4 is a plan view of the under side of the plow, and furrow-closer. Fig. 5 is a plan view of the entire machine; Fig. 6 is a plan view, on a larger scale, showing a cam for throwing out the clutch. Fig. 7 is a horizontal sectional view taken on the line 7—7, Fig. 9, showing a detail of construction hereinafter referred to. Fig. 8 is a perspective view to show structural features of the seed feeding wheel in its relation to a wall with which it co-operates. Fig. 9 is a front view, on a larger scale, showing the seed containing and feeding and delivering portion of the machine. Fig. 10 is a vertical sectional view on line 10—10, Fig. 9. Fig. 11 is a substantially vertical sectional view on line 11—11, Fig. 9.

Similar characters of reference indicate corresponding parts in all of the views.

In the drawings, A represents the propulsion frame of the seed planting machine, the same comprising forwardly convergent bars $a$ $a$, having rear end handles and legs $a$ mounted at their forward ends on the axle $b$ of the centrally disposed traction wheel B. A subsidiary frame C is also, at its forward end, hung on the wheel axle and normally inclines downwardly and rearwardly therefrom and has connected at its rear end a chain $c$, the free end portion of which is engaged through a notched lug $c^2$ on the cross member $a^2$ of the handle frame.

The subsidiary frame C has mounted on a rear portion thereof a seed receptacle D which, in the present instance, is made in the form of a semi-cylindrical upwardly opening hopper having at the rear lower portion thereof an aperture $d$ through which a small quantity of the considerable mass of seeds promiscuously thrown into the receptacle may rearwardly pass into a secondary chamber formed between the rear wall of the receptacle proper and a plate of glass $e$ (or other suitable material), the upper edge of which is in proximity to the upper open end of a downwardly delivery spout E supported on the frame C and having the lower open end thereof in proximity to the ground at the line of the furrow opened by the plow F as the machine is forwardly moved, and almost directly thereafter closed by the furrow closing lips $f f$ carried on a flat downwardly inclined plate G, which in the operation of the machine is arranged to have a dragging action along the ground.

In detail and as shown in Figs. 10 and 11, said hopper or receptacle D is provided, at the rear of its back wall, $d^2$, with an extension $i$, comprising an annular flange $h$, the upper circular half of such flange extending above the open top of the receptacle proper; and the said annular flange is surrounded by a ring $j$ having approximately the width of the flange $h$ and having, removably secured on its rearward face, as for instance by the screws $j^2$, a ring H which is revoluble with the ring $j$ which is carried around the flange,— said ring H having its location in a plane next to the circular edge of the said flange h and it has internally regularly spaced ratchet like feeding teeth k k which are transversely and rearwardly inclined relatively to the face of the ring H, as represented in Figs. 8, 9, and 10.

The outer face of the ring moves substantially in contact with a plate J, preferably of glass, the same being retained in grooved lugs m m on the widened transverse rear wall of the seed receptacle; and said plate rests on a bar of the frame C, and projects, as represented in Figs. 9 and 10, slightly above the axial center of the flange h and toothed feed ring k.

The aforementioned seed delivery spout E has the edge of its upper open end bearing directly against the plate J at or near the upper edge portion of the latter and sidewise removed from the center so as to be adjacent the path of movement of the said pocket-forming teeth in the ring.

It will be here stated that in Fig. 9 the plate, being understood as glass, does not conceal from view portions of the apparatus represented by full lines, which are next beyond such glass plate.

The ring $j$ which carries the seed pocket wheel is constructed as a crown gear wheel or face gear wheel, the teeth $n$ thereof projecting from the forward surface of the ring, which is opposite from that on which the seed pocket ring is detachably affixed.

The gear carrying ring $j$ is retained against displacement on the annular flange h about which it revolves by lugs o which are secured by screws on the rear wall of the seed receptacle frame, which lugs edgewise enter a peripheral groove $o^2$ in the ring $j$,—such retaining engagement in no way impeding the free rotary movement of the ring.

The revoluble movement of the ring $j$ and the seed-pocket ring H which is unitary therewith, is in consequence of the forward movement of the wheeled frame, as pushed by the user through driving connections, of which the sprocket wheel K on the traction wheel axle is the primary element. Around the sprocket wheel K runs a sprocket chain $K^2$ which also runs around a sprocket wheel $K^3$ which is loose and also axially slidable on a short horizontal shaft L, which is rigidly mounted on and projects laterally from one side of the wall of the seed receptacle D. Affixed on the said shaft L inside of the location of the sprocket wheel $K^3$ and closely against the side of the receptacle D is a spur gear wheel M, which meshes into the teeth of the aforementioned annular gear wheel $n$ on the revoluble ring $j$.

The sprocket wheel $K^3$ is normally in clutch, as shown in Fig. 2, with the spur gear wheel M,—a simple dowel and socket form of clutch at the hubs of the wheels being adequate; and the parts are normally maintained in clutch by the spiral spring $p$ in compression against a shoulder-forming nut on the extremity of the shaft L and the outer face of the sprocket wheel $K^3$.

When desired, the sprocket wheel $K^3$ may be thrown out of clutch, as indicated in Fig. 3, so that, as will be frequently desirable, it will be possible to propel the machine without causing a seed feeding and delivering operation of the mechanism for such purpose; and as a means for throwing out the clutch there is a cam or button $q$ of oblong shape carried at the lower end of a vertical handle shaft $q^2$ which is journaled through a suitably located and supported stationary bracket lug $q^3$. By turning the handle shaft $q^2$ a quarter way around, the cam pries the sprocket wheel away from and out of clutch with the gear wheel M, and holds the parts unclutched, as represented in Figs. 3 and 6, until such time as the purposed quarter turn of the handle shaft, reversely restores the parts to clutched relations.

The operation of the machine will be now explained: A quantity of seeds to be planted in drills is supplied in sufficiency in the feed receptacle D, the suspension chain for the subsidiary frame is arranged so that such frame may have a downwardly and rearwardly inclined position for the plow F and furrow closer to operate on the ground. The handle frame A being grasped in the manner of the handles of a wheel-barrow and thereby properly raised, about as represented by the full lines in Fig. 1, the machine in advancing causes, through the driving connections between the traction wheel B and the crown wheel $n$ a revoluble movement at moderate speed of the pocketed seed feeding wheel. It will be here explained that although the bottom of the seed receptacle $d$ is, while the machine is being operated, somewhat downwardly and rearwardly inclined whereby the seeds have a tendency to gravitate towards the plate J, the restricted size of the opening through the lower portion of the rear wall of the seed hopper proper while permitting the discharge of ample seeds therethrough, prevents any too considerable banking up of the seeds against the plate J within the supplemental chamber, which is formed in the annular extension flange h and as may be best understood on reference to Fig. 10. The seeds do, however, settle and fill into each of the pockets in the annular ring plate H, and by the inclination of the bases of such pockets rearwardly and towards the plate J, the seeds have the tendency, as the plate moves in its circular course, to settle and impinge against the inner face of the plate, and to be, on the other hand, without tendency to become displaced from their pocketing in the feed ring after having once assumed the position therein (see Fig. 8).

Now so soon as a seed in a given pocket reaches the height represented at x in Fig. 9, at or slightly above the upper edge of the plate J, it is free to roll, and will roll, or slide along the downwardly and rearwardly inclined base of the pocket, and will slide or roll across the upper edge of the plate J and be received into the upper open mouth of the spout E and will fall and be guided therethrough in a central line of the machine into the furrow formed by the plow F, which is positioned slightly in advance of the open lower delivery end of the spout. By the time the seed in the next pocket is brought up to the position for its liberation over the edge of the plate j and into the spout, the machine has bodily progressed a suitable distance so that the next seed falls into the furrow at a proper spacing from the previously delivered one; and so on throughout the entire line of the drill; and, of course, it is apparent that the rearwardly convergent lips of the furrow closer almost immediately after the depositing of the seed in the drill automatically closes the furrow and covers the seed with earth.

It is considered an advantage to have the plate J of glass, as thereby the user of the machine can always observe the amplitude of the seed supply and the proper disposition of the seeds individually in the respective pockets in the seed feeding ring H; and he can always have the satisfying observation that the seeds are being carried partially around and upwardly for delivery, without any skipping into the guide spout.

These machines are to be furnished with a series of interchangeable rings H having a standard external size, but having the pocket forming tooth thereof, while the same in principle and character as illustrated in Figs. 8 and 9, modified as to distance of separation and also their base widths to correspond with different sizes, shapes, and characters of seeds or other articles to be planted.

When it is desired to change a seed feeding pocket ring H, which may be in place as shown on its annular support j, having been used, for instance, for the planting of beet seeds, for one for handling and planting another kind of seeds, the plate J is first lifted out from its retaining lugs m, the upright guide spout E is swung rearwardly on its swinging support to the position represented by the dotted lines in Fig. 10, and the pocket ring is replaced by the one suitable for the different seed planting work to be performed, after which the glass plate J and guide spout are again restored to their position shown by the full lines in Fig. 10. The last referred to swinging support for the spout E consists of an eye bolt, the eye r of which embraces the intermediate portion of the spout, while the shank of the bolt extends through a member of the frame C and receives on its screw threaded extremity the thumb nut $r^2$, which latter when tightened draws the ring eye r to a point for clamping the spout against the side of the said member of the frame C, while, manifestly, the loosening of the nut leaves the ring bolt and spout free to have the oscillation desired.

When the user of the machine desires to rest, he merely lets the handle frame down to the lower position shown by the dotted lines in Fig. 1, and if he desires to run the machine over the ground when not seed planting, he throws the sprocket wheel $K^3$ out of clutch with the gear wheel M, and also draws up the chain c to a new place of engagement in the notched lug $c^2$ so that the subsidiary frame C with the plow and furrow closer will in the natural holding of the handle frame be above and clear from the ground. The chain c also serves the purpose of adjusting the frame C relatively to the handle frame, as will be found of convenience to different persons of varying heights having occasion to use the machine in the manner most available to them.

By reason of the nature of the organization of this machine, which has been studied with a view to cheapness of construction, there is necessity for very little close or fine mechanical work, and very little of the mechanism requires to be "machined," and hence, under this invention a seed planting machine may be produced at comparatively low cost, which will be found entirely reliable in the performance of the seed planting work. And while I have described with considerable particularity detailed constructions of the machine as the same has been produced and successfully used, I desire to state that there are many minor changes from the particular forms of parts which I have described that may be permitted without departing from my invention or sacrificing any of the advantages thereof.

I claim:—

1. A seed-planting machine, comprising, in part, a hopper; a rotatable, seed-feeding mechanism disposed in proximity thereto and comprising, in part, an annular, gear-carrying member having an exterior, circumferential groove; and removable lugs carried by the hopper and engaging in said groove.

2. A seed-planting machine, comprising, in part, a hopper; a rotatable, seed-feeding mechanism disposed in proximity thereto and comprising, in part, an annular, gear-carrying member having an exterior, circumferential groove; removable, slotted lugs carried by the hopper and engaging in said groove; and set-screws projecting through said slots and into said hopper.

3. A seed-planting machine, comprising, in part, a hopper; a rotatable, seed-feeding mechanism disposed in proximity thereto and comprising, in part, an annular, gear-carrying member having an exterior, circumferential groove; an annular seed-feeding ring, provided with feeding-pockets, secured to said gear-carrying member; and removable lugs carried by the hopper and engaging in said groove.

4. A seed-planting machine, comprising, in part, a hopper; a rotatable, seed-feeding mechanism disposed in proximity thereto and comprising, in part, an annular, gear-carrying member having an exterior, circumferential groove; an annular seed-feeding ring, provided with feeding-pockets, secured to said gear-carrying member; a plate removably carried by said hopper and disposed parallel to and against and terminating short of the top of said ring; and removable lugs carried by the hopper and engaging in said groove.

5. A seed-planting machine, comprising, in part, a hopper; a rotatable, seed-feeding mechanism disposed in proximity thereto and comprising, in part, an annular, gear-carrying member having an exterior, circumferential groove; an annular seed-feeding ring, provided with feeding-pockets, secured to said gear-carrying member; a glass plate removably carried by said hopper and disposed parallel to and against and terminating short of the top of said ring; and removable lugs carried by the hopper and engaging in said groove.

6. A seed-planting machine, comprising, in part, a hopper; a rotatable, seed-feeding mechanism disposed in proximity thereto and comprising, in part, an annular, gear-carrying member having an exterior, circumferential groove; an annular seed-feeding ring, provided with feeding-pockets, secured to said gear-carrying member; removable lugs carried by the hopper and engaging in said groove; said hopper being also provided with vertically-extending sockets; and a plate adapted to be removably retained in said sockets and to be disposed parallel to and against and terminate short of the top of said annular ring.

7. A seed-planting machine, comprising, in part, a hopper; a rotatable, seed-feeding mechanism disposed in proximity thereto and comprising, in part, an annular, gear-carrying member having an exterior, circumferential groove; an annular, seed-feeding ring, provided with feeding-pockets, secured to said gear-carrying member; removable lugs carried by the hopper and engaging in said groove; and a delivery-spout adapted to be disposed in proximity to said ring.

8. A seed-planting machine, comprising, in part, a hopper; a rotatable, seed-feeding mechanism disposed in proximity thereto and comprising, in part, an annular, gear-carrying member having an exterior, circumferential groove; an annular, seed-feeding ring, provided with feeding-pockets, secured to said gear-carrying member; removable lugs carried by the hopper and engaging in said groove; and a delivery-spout, normally stationary, mounted on a fixed axis, and means for permitting, when desired, oscillatory movement thereof away and toward proximity to said ring.

Signed by me at St. Johnsbury, Vermont in presence of two subscribing witnesses.

HORACE H. MILLER.

Witnesses:
HARLAND B. HOWE,
MAE L. LACASSE.